United States Patent
Park et al.

(10) Patent No.: US 9,333,477 B2
(45) Date of Patent: *May 10, 2016

(54) HYDROCARBON REFORMING DEVICE USING MICRO CHANNEL HEATER

(75) Inventors: Jong-Soo Park, Daejeon (KR);
Kyung-Ran Hwang, Daejeon (KR);
Chun-Boo Lee, Daejeon (KR);
Sung-Wook Lee, Jeollanamdo (KR);
Shin-Kun Ryi, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/318,033

(22) PCT Filed: Apr. 15, 2011

(86) PCT No.: PCT/KR2011/002690
§ 371 (c)(1),
(2), (4) Date: Oct. 28, 2011

(87) PCT Pub. No.: WO2012/141354
PCT Pub. Date: Oct. 18, 2012

(65) Prior Publication Data
US 2014/0030156 A1 Jan. 30, 2014

(51) Int. Cl.
*B01J 7/00* (2006.01)
*B01J 15/00* (2006.01)
*B01J 19/00* (2006.01)
*H01M 8/06* (2016.01)
*C01B 31/18* (2006.01)
*C01B 3/38* (2006.01)
*C01B 31/20* (2006.01)

(52) U.S. Cl.
CPC ............ *B01J 15/005* (2013.01); *B01J 19/0093* (2013.01); *C01B 3/384* (2013.01); *C01B 31/18* (2013.01); *C01B 31/20* (2013.01); *H01M 8/0618* (2013.01); *B01J 2219/00783* (2013.01); *B01J 2219/00806* (2013.01); *B01J 2219/00822* (2013.01); *B01J 2219/00835* (2013.01); *B01J 2219/00873* (2013.01); *B01J 2219/00876* (2013.01); *B01J 2219/00889* (2013.01); *C01B 2203/0233* (2013.01); *C01B 2203/0283* (2013.01); *C01B 2203/0822* (2013.01); *C01B 2203/0827* (2013.01); *Y02E 60/50* (2013.01); *Y02P 20/128* (2015.11); *Y02P 20/129* (2015.11)

(58) Field of Classification Search
CPC combination set(s) only.
See application file for complete search history.

(56) References Cited

U.S. PATENT DOCUMENTS

| | | | |
|---|---|---|---|
| 5,432,023 A * | 7/1995 | Yamada et al. | 429/442 |
| 7,335,432 B2 * | 2/2008 | Koripella | 429/423 |
| 2003/0152488 A1 * | 8/2003 | Tonkovich et al. | 422/99 |

(Continued)

FOREIGN PATENT DOCUMENTS

| KR | 10-0719486 B1 | 5/2007 |
|---|---|---|
| KR | 10-2009-0124091 A | 6/2011 |

*Primary Examiner* — Kaity Handal
(74) *Attorney, Agent, or Firm* — Baker Hostetler LLP (57) ABSTRACT

Disclosed is a hydrocarbon reforming device using a micro channel heater capable of utilizing combustion heat of a fuel as an energy source for reforming reaction of hydrocarbon, which includes metal sheets having micro channels laminated in plural, thus being suitably used as a middle and small compact type device for hydrogen production. Specifically, in the case where a hydrogen purification process is applied to a hydrogen production device combined with a separation membrane, since the hydrogen-containing gas, which does not penetrate the separation membrane, can be utilized as a fuel, the inventive device may be utilized as a hydrogen production system having high efficiency.

6 Claims, 6 Drawing Sheets

(56) References Cited

U.S. PATENT DOCUMENTS

| | | | |
|---|---|---|---|
| 2004/0031592 A1* | 2/2004 | Mathias et al. | 165/104.19 |
| 2005/0265915 A1* | 12/2005 | Tonkovich et al. | 423/584 |
| 2008/0050634 A1* | 2/2008 | Park et al. | 429/34 |
| 2009/0311150 A1* | 12/2009 | Cho et al. | 422/190 |
| 2011/0274596 A1* | 11/2011 | Moon et al. | 422/600 |
| 2014/0140896 A1* | 5/2014 | Moon et al. | 422/162 |
| 2014/0178259 A1* | 6/2014 | Hwang et al. | 422/162 |
| 2014/0301917 A1* | 10/2014 | Park et al. | 422/602 |

* cited by examiner

HYDROCARBON REFORMING DEVICE USING MICRO CHANNEL HEATER

CROSS-REFERENCE TO RELATED APPLICATIONS

This application is a National Stage of International Patent Application No. PCT/KR2011/002690, filed Apr. 15, 2011, the content of which is incorporated herein by reference in its entirety.

TECHNICAL FIELD

The present invention relates to a hydrocarbon reforming apparatus using a micro channel heater, more particularly, to a hydrocarbon reforming apparatus using a micro channel heater, and having a technical configuration wherein multiple metal sheets, each having a micro channel, are laminated, and heat transfer plates are arranged above and under a catalyst plate in a supply system wherein hot exhaust gas generated by fuel combustion and a reforming catalyst layer are crossed, to thereby improve heat transfer rate for hydrocarbon reforming reaction.

BACKGROUND ART

Figure 1:
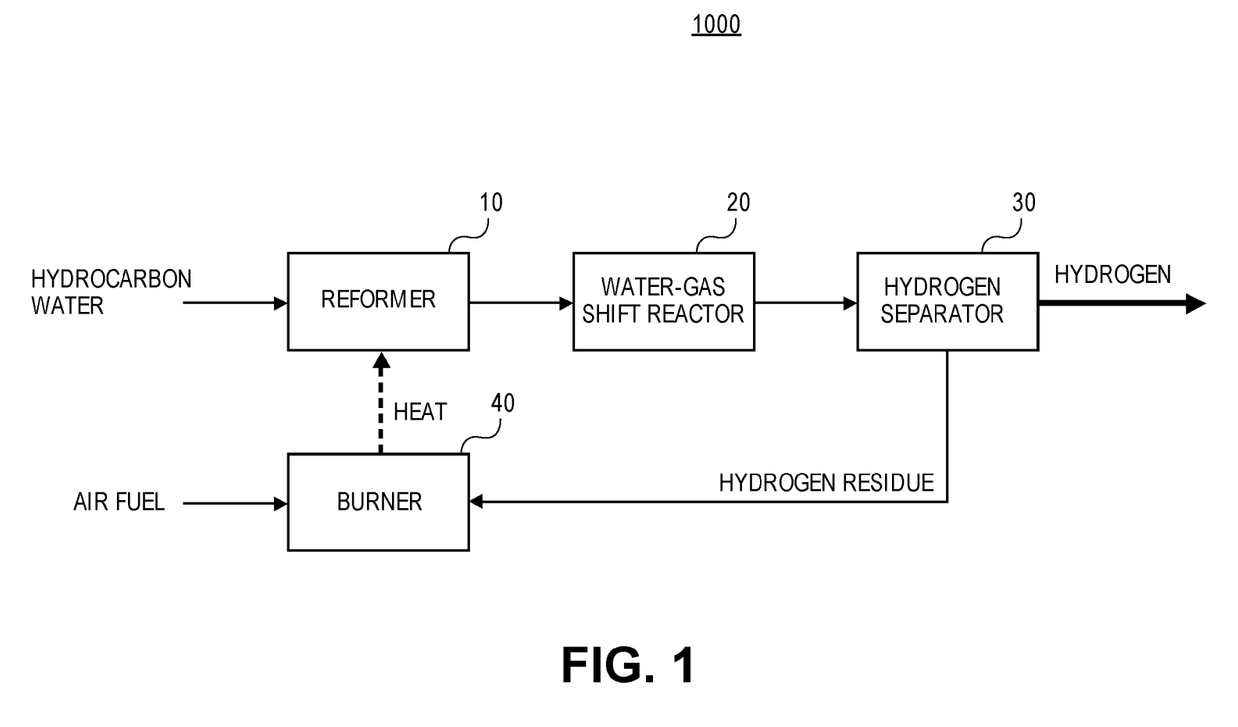
FIG. 1 is a block diagram showing production of hydrogen according to the related art.

With development in various industrial fields, a demand for a small hydrogen production apparatus for on-site or on-board use is expected to increase. A large-scale hydrogen production process commercially available in the art is shown in FIG. 1. That is, hydrocarbons are converted into a synthetic gas including hydrogen and carbon monoxide in a reforming apparatus 10 and the synthetic gas is subjected to water gas shift (WGS) in an WGS reactor 20, followed by removal of carbon monoxide from the reformed gas through a catalyst or a separation membrane in a hydrogen separator 30, thus resulting in hydrogen. In this regard, a heat of reaction ('reaction heat') required in the reforming apparatus 10 may utilize a combustion heat generated from a burner 40 by burning a part of the produced hydrogen.

Production of hydrogen using hydrocarbons may be performed according to a variety of reactions such as the following reaction schemes 1 to 3:

CH$_4$+H$_2$O→CO+3H$_2$ reaction heat:+206 kJ/mol    Reaction scheme 1

CO$_2$+CH$_4$→2CO+2H$_2$ reaction heat:+247 kJ/mol    Reaction scheme 2

CH$_4$+½O$_2$→CO+2H$_2$ reaction heat:−36 kJ/mol    Reaction scheme 3

Among the foregoing, stream reforming according to Reaction scheme 1, wherein a reaction product has the highest hydrogen concentration, has drawn much attention in the related art.

However, the process entails difficulties in supplying heat required for reaction, as illustrated in Reaction scheme 1. Since the steam reforming may impart a conversion of hydrocarbon (methane) of 95% or more at a reaction temperature of 750° C. or higher, arduous and constant efforts are required in order to supply a reaction heat while maintaining a high temperature.

The reaction heat required for Reaction scheme 1 may be generated through combustion (catalyst oxidation or combustion), as shown in Reaction scheme 4.

CH$_4$+2O$_2$→CO$_2$+2H$_2$O reaction heat:−801 kJ/mol Reaction scheme 4

In a process according to Reaction scheme 4, in order to ensure efficient heat transfer, a high temperature difference ΔT, a great contact area 'A' and a substance having a high heat transfer constant 'k' are required.

In a process according to Reaction scheme 4, in order to ensure efficient heat transfer, a substance having a high temperature difference ΔT, a great contact area 'A' and a high heat transfer constant 'k' is required.

However, it is impossible to raise a temperature of a flame without constraint, which is needed for heating, to obtain a desired high temperature difference. Also, constitutional materials of reactor may entail restrictions, and the heat transfer constant may be determined as an inherent value of each of such constitutional materials, thus entailing limitations.

Accordingly, a heat transfer area 'A' is only controllable item in construction of a reactor, tends to increase.

As the reactor for the foregoing use, there have been attempts to utilize a reactor having a micro channel on a metal sheet. In particular, the applicants of the present invention suggested and developed Korean Patent Registration No. 10-0719486 (a micro-combustion/reforming device) and Korean Patent Application No. 10-2009-0124091 (a hydrocarbon reforming device using a micro channel heater), the above inventions have disclosed a micro-combustion/reforming device with a module configuration by laminating processed metal sheets in plural, so as to ensure a larger contact area per unit volume.

Combustion of hydrocarbons (NG, LPG, alcohols) for generating the reaction heat is a violent (active) reaction generating exothermic heat in large quantities and proceeds through catalytic combustion or non-catalytic combustion.

The catalytic combustion includes preheating of a catalyst layer to a reaction temperature range, at which oxidation may be initiated, and entails a problem of durability of a micro channel coated with the catalyst, when exposed to heat for a long time. That is, for an oxidative catalyst, when the catalyst is exposed to heat throughout operation of a burner, it is difficult to continue oxidative activation, thus entailing restrictions in utilization thereof. On the other hand, the non-catalytic combustion cannot be applied to a compact micro channel reactor since a space for extending ignition flame is required.

A hydrocarbon reforming catalyst is utilized in various forms and a variety of patents and related documents disclose catalyst coating methods, however, there is still a need for specific configurations of a reactor, which are compatible with characteristics of a micro channel reactor, to be applicable thereto, as described in the present invention.

SUMMARY OF THE INVENTION

Technical Problem

Accordingly, to solve the above problems, it is an object of the present invention to provide a high efficiency hydrocarbon reforming device which includes laminating metal sheets having micro channels in plural layers to effectively transfer heat of combustion ('combustion heat') to a reforming catalyst plate.

Another object of the present invention is to provide a method for application of a reforming catalyst to a micro channel reactor.

Technical Solution

The present invention has been completed on the basis of an idea wherein hydrogen oxidation shown in Reaction scheme 5 may be initiated on the surface of a noble metal catalyst at room temperature;

$H_2 + \frac{1}{2}O_2 \rightarrow H_2O +$ production heat(56 kJ/mol)    Reaction scheme 5

Briefly, at the initial stage of operation of the reactor, heating is conducted using hydrogen to a predetermined temperature and then methane may be supplied to produce a main heat source. Otherwise, a mixed gas including hydrogen and other hydrocarbons is used from the initial stage of operation of the reactor and the heating may be initiated at room temperature.

As such, if using hydrogen with high ignition properties alone or in combination with hydrocarbons, a heating system of the reactor may be simplified, thereby increasing competitiveness of a compact type reactor such as a micro channel reactor.

According to the present invention, using a nickel-based catalyst may produce a synthetic gas from hydrocarbons. Hydrocarbon reforming characteristics of the nickel-based catalyst are well known in the related art. In particular, the present invention provides a hydrocarbon reforming apparatus including a nickel plate type catalyst combined with a micro channel type reactor.

In addition, an oxidative catalyst coated material is placed in an initial mixing point region of air and fuel, in order to enable ignition in a heating system. During operation, the mixed gas including hydrogen or hydrogen-containing hydrocarbon as well as air is in contact with the ignition catalyst, thus being ignited.

The reforming catalyst may be a metal plate made of metal powder. In addition, three-dimensional mixing plates are located above and under the catalyst plate and hydrocarbons and steam vertically pass through a catalyst layer. In this case, using the three-dimensional mixing plates may impart a bonding force to a catalyst holder plate connected with a catalyst plate, impart a space for reactant flow, and function as a heat energy transfer body from a heating plate to the catalyst plate.

In order to accomplish the foregoing objects, according to an embodiment of the present invention, there is provided a hydrocarbon reforming device using a micro channel heater, comprising: a top plate including an air feeder connected to an air supplier to supply air, a fuel feeder which is connected to a fuel supplier to supply the fuel and has an ignition catalyst provided therein, and a reformed gas exhaust line wherein the reformed gas is generated by reforming reaction; a bottom plate including a source feeder connected to a source (gas) supplier to supply the source gas and an exhaust gas outlet line wherein the exhaust gas is generated from the reaction; an air preheating part which is provided under the top plate and includes a heating plate and a reforming plate alternately laminated therein, wherein the supplied air from the air feeder is preheated using heat residue of the reformed gas and mixed with the fuel, in turn conducting combustion; an upper channel isolation plate which is provided under the air preheating part and through which the combusted exhaust gas and reformed gas only are passed; a reforming reaction part having: a heating plate which is provided under the upper channel isolation plate to transfer heat of combustion ('combustion heat') of the exhaust gas; and a reforming plate which is provided under the heating plate and arranged between the upper reformed gas channeling plate and the lower reformed gas channeling plate, to expose the reforming catalyst to top and bottom sides, thereby enabling the source gas to move in a direction perpendicular to the reformed catalyst while contacting the same; an upper channel isolation plate which is provided under the reforming reaction part, to pass only the exhaust gas passing through the reforming reaction part as well as the preheated source gas therethrough; and a source gas preheating part which is arranged between the bottom of the upper channel isolation plate and the top of the bottom plate, and includes a waste heat recovering plate and a source gas preheating plate alternately laminated therein, to preheat the source gas with the exhaust gas passing through the reforming reaction part, wherein micro channels are provided respectively on the top face of the heating plate, the top face of the reforming plate, the bottom face of the upper reformed gas channeling plate, and the top face of the lower reformed gas channeling plate.

Preferably, the air feeder and the fuel feeder are arranged to face each other, and the reformed gas exhaust line is arranged while being spaced from the air feeder and the fuel feeder, in the top plate; wherein the bottom plate has substantially the same cross-sectional shape and area as the top plate, and the fuel feeder is located at the same position as the fuel feeder in the top plate.

Preferably, the heating plate has four through-holes arranged while being spaced from one another, and two among these holes are communicated with the micro channel while the micro channel crosses between the other two through-holes; wherein four through-holes and micro channels are arranged on the reforming plate and the lower reformed gas channeling plate, respectively, in such a way that the above plates are substantially identical to the heating plate rotated at an angle of 180° on a horizontal plane; and wherein the upper reformed gas channeling plate is substantially identical to the heating plated turned over, in such a way that the lower reformed gas channeling plate faces the micropath.

According to another embodiment of the present invention, there is provided a hydrocarbon reforming device using a micro channel heater, comprising: a top plate including an air feeder connected to an air supplier to supply air, a fuel feeder which is connected to a fuel supplier to supply the fuel and has an ignition catalyst provided therein, and a reformed gas exhaust line wherein the reformed gas is generated by reforming reaction; an air preheating part having: at least one pair of air inflow lines which are provided under the top plate, includes micro channels formed on top faces thereof, and are alternately laminated and connected to the air feeder; a combustion line connected to the fuel feeder; a reformed gas outflow line connected to the reformed gas exhaust line; an air preheating plate which forms a reformed gas channeling line arranged apart from the air outflow line, the combustion line and the reformed gas outflow line; and a reformed gas cooling plate, wherein the air preheating plate connects the air feeder and the combustion line through the micro channel, and the reformed gas cooling plate connects the reformed gas exhaust line and the reformed gas channeling line through the micro channel; an upper channel isolation plate which is arranged under the air preheating part to close the reformed gas outflow line and the bottom of the air inflow line; a reforming reaction part having: at least one combustion heat exchange plate which is provided under the upper channel isolation plate and communicated with the combustion line and the reformed gas channeling line, and includes a micro channel for connecting the exhaust gas channeling line and the combustion line provided on the top face thereof; an upper reformed gas channeling plate which is provided under the combustion heat exchange plate and communicated with the exhaust gas channeling line, and includes a micro channel communicated with the reforming gas channeling line, while being isolated from the exhaust gas channeling line, provided thereon; a catalyst holder plate which is provided under the upper reformed gas channeling plate, includes a reforming catalyst in the center thereof, and is communicated with the exhaust gas channeling line; and a lower reformed gas channeling plate which is provided under the catalyst holder plate and communicated with the exhaust gas channeling line, and which includes a micro channel communicated with the source gas channeling line, while being isolated from the exhaust gas channeling line, provided thereon; a lower channel isolation plate which is arranged under the reforming reaction part to close the source gas inflow line and the top of the exhaust gas outflow line; a source gas preheating part having: at least one pair of waste heat recovering plates and at least one pair of source gas preheating plates which are provided under the lower channel isolation plate, includes micro channels on top faces thereof, which are alternately laminated to each other to form the exhaust gas channeling line, the exhaust gas outflow line, the source gas inflow line, and the source gas channeling line, wherein the waste heat recovering plates connect the exhaust gas channeling line and the exhaust gas outflow line through the micro channel, while the source gas preheating plate connect the source gas inflow line and the source gas outflow line through the micro channel; and a bottom plate which is provided under the source gas preheating plate and communicated with the source supplier to supply the source, and includes the source feeder connected to the source gas channeling line and an exhaust gas outlet line connected to the exhaust gas outflow line.

Preferably, the top plate is further provided with a reformed gas temperature measuring tube communicated with the reformed gas channeling line, the bottom plate is provided with a source gas temperature measuring tube communicated with the source gas channeling line, and both the reformed gas temperature measuring tube and the source gas temperature measuring tube have thermocouples arranged therein.

Preferably, the bottom face of the reforming catalyst is arranged to be in the same plane as the bottom face of the catalyst holder plate, a thickness of the reforming catalyst is thinner than that of the catalyst holder plate, an upper three-dimensional mixing channel is mounted above the reforming catalyst to be in the same level as the top face of the catalyst holder plate, and a lower three-dimensional mixing channel is provided on the center of the bottom face of the catalyst holder plate by an auxiliary plate.

Preferably, the upper three-dimensional mixing channel is protruded over the catalyst holder plate before bonding, while being in the same level as the top face of the catalyst holder plate when being bonded and compressed by compressive force.

Preferably, a cross-sectional area of the lower three-dimensional mixing channel is smaller than that of the reforming catalyst.

Advantageous Effect

As apparent from the above description, a micro channel type hydrocarbon reforming device is provided according to the present invention, and utilization of a middle and small compact type apparatus for production of hydrogen based on the foregoing reforming device is anticipated. In particular, in the case where a hydrogen purification process is applied to a hydrogen production apparatus combined with a separation membrane, the hydrogen-containing gas, which does not penetrate the separation membrane, may be utilized as a fuel, in turn being used as a hydrogen production system having high efficiency.

The inventive system may also attain excellent effects, when it is combined with various fuel cells wherein off gas includes waste gas containing hydrogen.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, preferred embodiments of the present invention will be provided to allow those skilled in the art to which the present invention pertains to more clearly understand and easily embody the present invention with reference to the accompanying drawings. However, a variety of modifications, variations and/or alterations of such embodiments of the present invention may be possible and the present invention is not particularly restricted to the following embodiments. For clarity, some components or parts irrelevant to technical configurations of the present invention will be omitted from the drawings, and like reference numerals denote elements having substantially the same configurations or performing similar functions and actions throughout the drawings.

Figure 2:
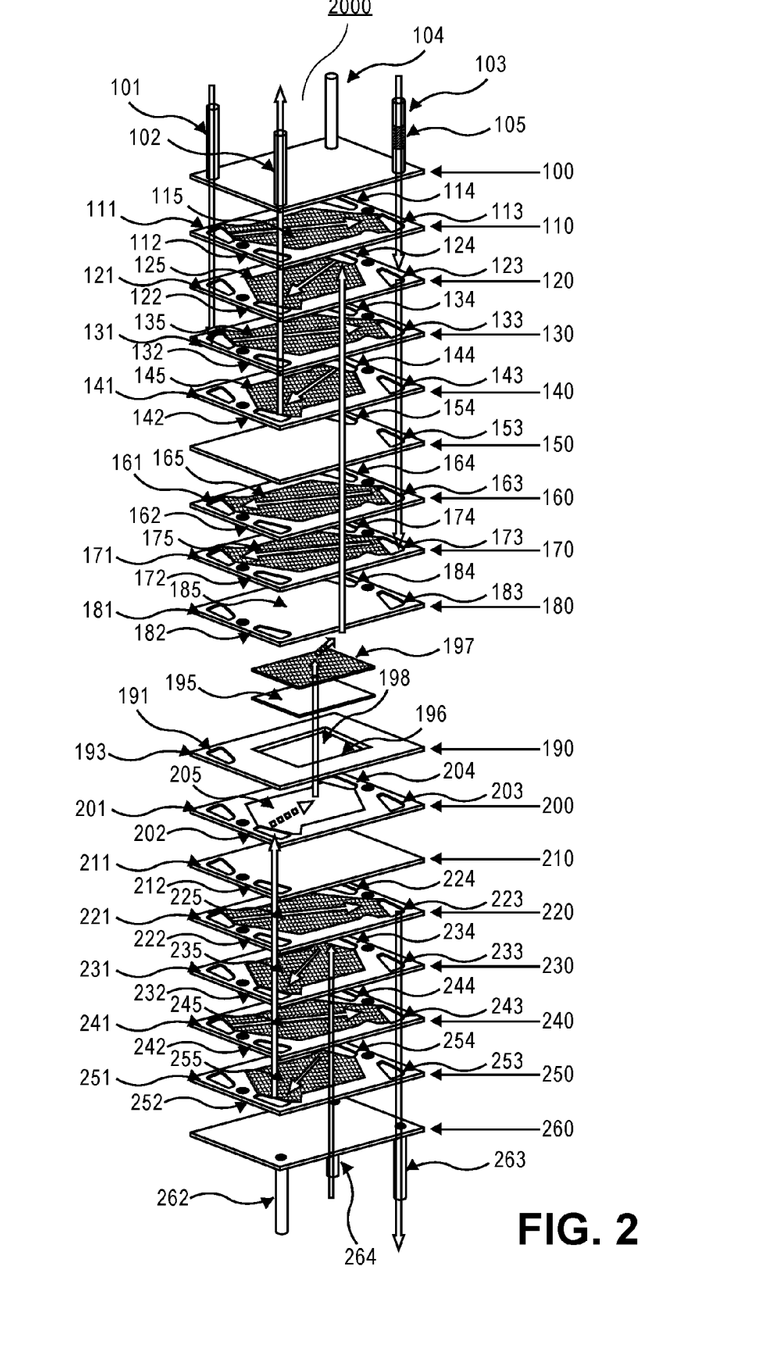
FIG. 2 is an exploded perspective view showing a hydrocarbon reforming device according to the present invention.

A hydrocarbon reforming device 2000 using a micro channel heater according to the present invention, is configured by laminating a plurality of plates as shown in FIG. 2, followed by combination through diffusion bonding, electric welding, arc welding, etc., resulting in a compact structure as shown in FIG. 4.

The hydrocarbon reforming device 2000 may have a top plate 100 and a bottom plate 260 arranged on the uppermost and the lowermost sides thereof.

Between the top and bottom plates 100 and 260, the following components are provided in sequential order: an air preheating part wherein air preheating plates 110 and 130 to heat air or fuel and reformed gas cooling plates 120 and 140 to decrease an exhaust temperature of the reformed gas are laminated alternately; a reforming reaction part which includes combustion heat exchange plates 160 and 170 to combust the preheated fuel with air, reformed gas channeling plates 180 and 200, and a catalyst holder plate 190 reforming a source gas to generate the reformed gas between the reformed gas channeling plates 180 and 200; and a source gas preheating part wherein source gas preheating plates 230 and 250 to preheat the source gas and waste heat recovery plates 220 and 240 to recover heat residue of the combustion exhaust gas are laminated alternately. In addition, in order to control the air, fuel, reformed gas and/or source gas flows, a top flow-path isolation plate 150 is located between the air preheating part and the reforming reaction part while a bottom flow-path isolation plate 210 is located between the reforming reaction part and the source gas preheating part.

The hydrocarbon reforming device 2000 may be principally in a rectangular form and have a channel formed in a diagonal direction, in consideration of simple fabrication thereof and efficiency per unit area.

On the outer side of the top plate 100, an air feeder 101, a reformed gas exhaust line 102, a fuel feeder 103 and a reformed gas temperature measuring tube 104 are provided. The air feeder 101 and the fuel feeder 103 face each other in a diagonal direction, while the reformed gas exhaust line 102 and the reformed gas temperature measuring tube 104 face each other in a diagonal direction.

For ignition of fuel gas inflow, an ignition catalyst 105 is applied to the inner wall of the fuel feeder 103. The ignition catalyst will be further described below. The ignition catalyst 105 may be prepared by undercoating the surface of a FeCrAlloy textile woven wool with $ZrO_2$ through a sol-gel process, calcining the coated wool at 900° C. for 10 hours to form a catalytic component based carrier, applying 0.1% of platinum to the surface of the carrier, followed by drying and calcinations (under an air atmosphere, 800° C. and 10 hours), resulting in the catalyst. In the case where the ignition catalyst 105 prepared as described above is placed on the inner wall of the fuel feeder 103 to utilize a gas containing a slight amount of hydrogen in the fuel, it is possible to omit a process of applying an oxidation catalyst to the surface of sixth and seventh micro channels 165 and 175 of the combustion heat exchange plates 160 and 170, as described below.

More particularly, effects attained by placing the ignition catalyst of the present invention in the fuel feeder 103, that is, effects of defining an ignition point, are substantially different from effects attained by a configuration in that the ignition catalyst is located at an outlet 263 for exhaust gas. That is, in the case where the ignition catalyst is present in the outlet 263 for exhaust gas, in order to move an ignition point to a position at which fuel and air are mixed, a single micro channel should have a desired size, that is, a quenching distance, on the surface of each of the plates 160, 170, 220 and 240 to prevent an ignition frame from being chilled. Therefore, a decrease in heat transfer area may be unavoidable. Accordingly, in order to maximize heat transfer efficiency, it is preferable to locate the ignition point within the fuel feeder 103, as described in the present invention, while maintaining a micro channel to have a smaller diameter of groove.

The carrier of the ignition catalyst may be prepared using a ceramic material in a granular, tube or rod form.

In order to improve durability of the ignition catalyst, a configuration of moving an ignited flame to an initial mixing position, after igniting from the outside, may be preferably used. In this regard, ignition may be executed by spark induction using high voltage or applying a noble metal-coated catalyst. For such a configuration, it is necessary to convert a gas flow direction in order to exhaust a mixed gas of hydrogen and air out of the reactor. That is, the mixed gas is discharged to the outside (operation 130) for ignition and, after ignition, a combustion gas is shifted and fed toward the heating plates 160 and 170. Other than the ignition catalyst, ignition using high voltage discharge may also be suitable for the purpose of the present invention.

At the bottom of the top plate 100, the air preheating plates 110 and 130 corresponding to the air preheating part as well as the reformed gas cooling plates 120 and 140 are alternately arranged. The air preheating plates 110 and 130 may preheat inflow air to be easily combusted and heat energy required for preheating may be absorbed from the reformed gas. Further, the reformed gas cooling plates 120 and 140 may recover heat contained in the reformed gas, in turn, increasing energy efficiency. According to embodiments of the present invention, two of air preheating plates 110 and 130, as well as two of reformed gas cooling plates 120 and 140, have been utilized. However, the number of these plates may also be increased, although increase in overall thickness and production costs should be considered.

The air preheating plates 110 and 130 and the reformed gas cooling plates 120 and 140 may include: first to fourth air feeding holes 111, 121, 131 and 141, which are communicated with the air feeder 101; first to fourth reformed gas exhaust holes 112, 122, 132 and 142, which are communicated with the reformed gas exhaust line 102; first to fourth combustion holes 113, 123, 133 and 143, which are communicated with the fuel feeder 103; and first and fourth reformed gas channeling holes 114, 124, 134 and 144, which are communicated with the reformed gas temperature measuring tube 104, respectively.

Additionally, first to fourth micro channels 115, 125, 135 and 145 are provided in a concave shape at the top of the air preheating plates 110 and 130 and the reformed gas cooling plates 120 and 140, respectively. The first micro channel 115 may communicate the first air feeding hole 111 and the first combustion holes 113 to each other, while isolating the first reformed gas exhaust hole 112 and the first reformed gas channeling hole 114 from each other. The second micro channel 125 may communicate the second reformed gas exhaust hole 122 and the second reformed gas channeling hole 124 to each other, while isolating the first air feeding hole 121 and the second combustion hole 123 from each other. The third micro channel 135 may communicate the third air feeding hole 131 and the first combustion hole 133 to each other, while isolating the third reformed gas exhaust hole 132 and the third reformed gas channeling hole 134 from each other. Lastly, the fourth micro channel 145 may communicate the fourth reformed gas exhaust hole 142 and the fourth reformed gas channeling hole 144, while isolating the first air feeding hole 141 and the second combustion hole 143 from each other.

At the bottom of the air preheating part, a top flow-path isolation plate 150 is arranged to block connection of the air feeder 101 to the reformed gas exhaust line 102. In the top flow-path isolation plate 150, fifth reformed gas channeling hole 154 and fifth combustion hole 153 are provided to be communicated with the reformed gas temperature measuring tube 104 and the fuel feeder 103, respectively.

At the bottom of the top flow-path isolation plate 150, the reforming reaction part is arranged. The reforming reaction part may include combustion heat exchange plates 160 and 170, a catalyst holder plate 190, and a pair of reformed gas channeling plates 180 and 200. The catalyst holder plate 190 may be interposed between an upper reformed gas channeling plate 180 and a lower reformed gas channeling plate 200.

The combustion heat exchange plates 160 and 170 are arranged while being in contact with the bottom of the top flow-path isolation plate 150. The number of the combustion heat exchange plates 160 and 170 may be optionally increased or decreased. The combustion heat exchange plates 160 and 170 may have a morphology substantially similar to that of the preheating plates 110 and 130. That is, the combustion heat exchange plates 160 and 170 may have: sixth and seventh exhaust gas channeling holes 161 and 171 on sites corresponding to the first to fourth air feeding holes 111, 121, 131 and 141; sixth and seventh idle holes 162 and 172 on sites corresponding to the first to fourth reformed gas exhaust holes 112, 122, 132 and 142; sixth and seventh combustion holes 163 and 173 on sites corresponding to the first to fifth combustion holes 113, 123, 133, 143 and 153; and sixth and seventh reformed gas channeling holes 164 and 174 on sites corresponding to the first to fifth reformed gas channeling holes 114, 124, 134, 144 and 154.

In addition, sixth and seventh micro channels 165 and 175, respectively, may be formed in a concave shape on the top of the combustion heat exchange plates 160 and 170. The sixth and seventh micro channels 165 and 175 may communicate the sixth and seventh exhaust gas channeling holes 161 and 171 and the sixth and seventh combustion holes 163 and 173 to each other, while isolating the sixth and seventh idle holes 162 and 172 and the sixth and seventh reformed gas channeling holes 164 and 174 from each other.

The sixth and seventh idle holes 162 and 172 may not be provided on the combustion heat exchange plates 160 and 170. However, for convenience in the manufacture thereof, the foregoing may be provided on the air preheating plates 110 and 130 in the same way.

Further, the sixth and seventh micro channels 165 and 175 may be possibly coated with a combustion catalyst such as platinum, Pt, in order to assist combustion.

Figure 3:
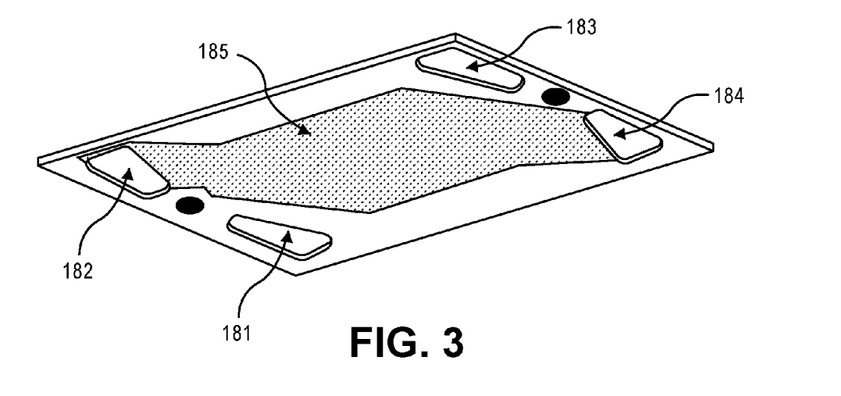
FIG. 3 is a bottom perspective view showing a channel plate for top reforming gas in the hydrocarbon reforming device shown in FIG. 2.

At the bottom of the combustion heat exchange plates 160 and 170, the upper reformed gas channeling plate 180 is arranged. As shown in FIG. 3, the upper reformed gas channeling plate 180 has an eighth micro channel 185 provided on the bottom thereof, in contrast to other plates. The upper reformed gas channeling plate 180 may also have an eighth reformed gas channeling hole 184 and the eighth reformed gas channeling hole 184 is communicated with the reformed gas temperature measuring tube 104 through the first to seventh reformed gas channeling holes 114, 124, 134, 144, 154, 164 and 174. In addition, an eighth exhaust gas channeling hole 181 may be communicated with the sixth and seventh exhaust gas channeling holes 161 and 171.

Further, the reformed gas channeling plate 180 may have eighth idle holes 182 and 183. The eighth idle holes 182 and 183 may not be provided on the upper reformed gas channeling plate 180. However, for convenience in the manufacture thereof, the foregoing may be provided on the air preheating plates 110 and 130 in the same way.

The eighth micro channel 185 may be formed to communicate the eighth idle hole 182 and the eighth reformed gas channeling hole 184 to each other, while the eighth exhaust gas channeling hole 181 and the eighth idle hole 183 are isolated from each other by the eighth micro channel 185.

The catalyst holder plate 190 is arranged under the upper reformed gas channeling plate 180, and the lower reformed gas channeling plate 200 wherein a tenth micro channel 205 facing the eighth micro channel 185 of the upper reformed gas channeling plate 180 is provided, is arranged under the catalyst holder plate 190.

Accordingly, the lower reformed gas channeling plate 200 may have substantially the same configuration as the upper reformed gas channeling plate 180, except that the tenth micro channel 205 is formed on the top of the lower reformed gas channeling plate 200.

A morphology of the lower reformed gas channeling plate 200 may be approximately similar to the reformed gas cooling plates 120 and 140. That is, the lower reformed gas channeling plate 200 may have: a tenth exhaust gas channeling hole 201 on a site corresponding to the first to fourth air feeding holes 111, 121, 131 and 141; a tenth source gas channeling hole 202 on a site corresponding to the first to fourth reformed gas exhaust holes 112, 122, 132 and 142; a tenth idle hole 203 on a site corresponding to the first to fifth combustion holes 113, 123, 133, 143 and 153; and a tenth reformed gas channeling hole 204 on a site corresponding to the first to fifth reformed gas channeling holes 114, 124, 134, 144 and 154.

Moreover, a tenth micro channel 205 may be provided in a concave form at the top of the lower reformed gas channeling plate 200. The tenth micro channel 205 may communicate the tenth source gas channeling hole 202 and the tenth reformed gas channeling hole 184 to each other, while isolating the tenth exhaust gas channeling hole 201 and the tenth idle hole 203 from each other.

The tenth idle hole 203 may not be provided on the lower reformed gas channeling plate 200. However, for convenience in the manufacture thereof, the foregoing may be provided on the reformed gas cooling plates 120 and 140 in the same way.

Moreover, the eighth micro channel 185 and the tenth micro channel 205 may be coated with a reforming catalyst such as nickel, Ni, in order to assist the reforming reaction.

Figure 4A:
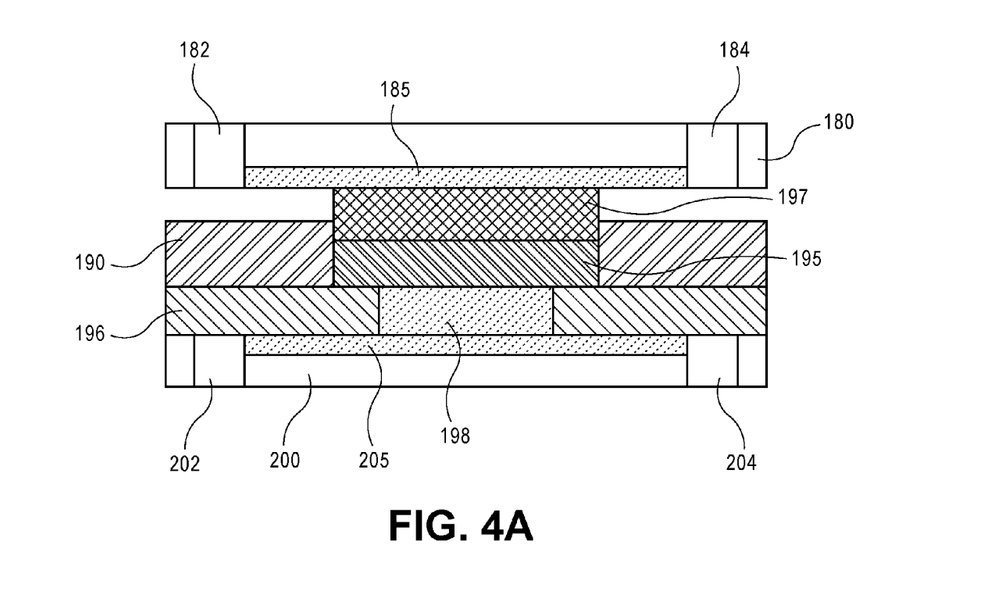
FIG. 4A is a cross-sectional view showing a catalyst holder plate and reforming reaction plates in the hydrocarbon reforming device shown in FIG. 2, before combining the reaction plates above and under the catalyst holder plate.

The catalyst holder plate 190 interposed between the upper reformed gas channeling plate 180 and the lower reformed gas channeling plate 200 may be configured as shown in FIG. 4A.

Figure 4B:
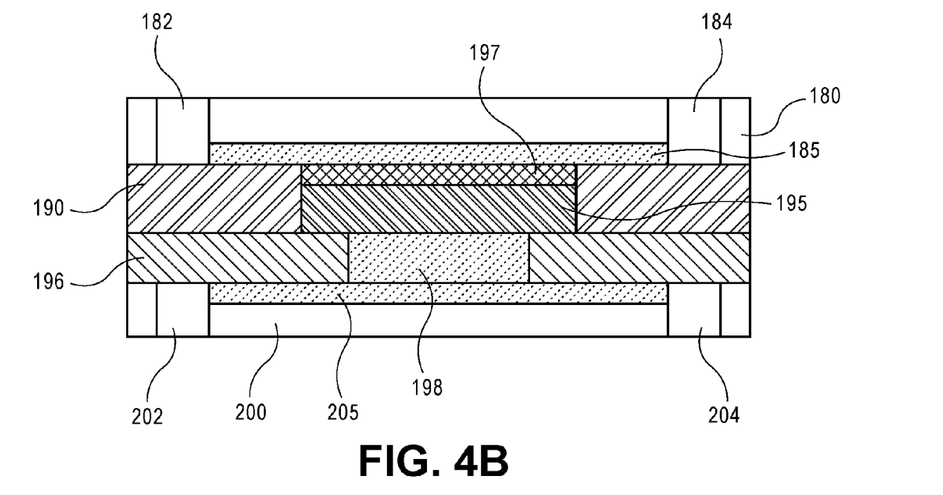
FIG. 4B is a cross-sectional view showing the catalyst holder plate and the reforming reaction plates in the hydrocarbon reforming device shown in FIG. 2, after combining the reaction plates above and under the catalyst holder plate.
Figure 5:
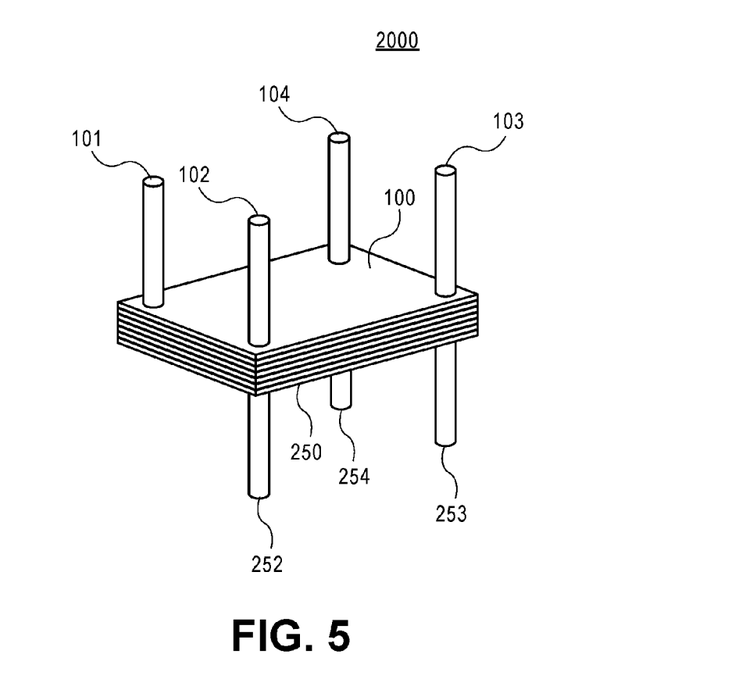
FIG. 5 is a perspective view showing the hydrocarbon reforming device shown in FIG. 2, in an assembly form.

More particularly, the catalyst holder plate 190 may be provided with a through-hole and a reforming catalyst 195 having a thinner thickness than the catalyst holder plate 190 may be placed in the through-hole. Here, the bottom face of the reforming catalyst 195 is arranged to be in the same plane as the bottom face of the catalyst holder plate 190. In addition, an upper three-dimensional mixing channel 197 is provided in the through-hole and the upper three-dimensional mixing channel 197 is protruded over the top face of the catalyst holder plate 190 at the initial stage, that is, before compressive bonding, as shown in FIG. 4A. Also, when it is combined with a compact reactor, contact efficiency between the catalyst holder plate 190 and an auxiliary plate 196 may be maximized by a force pressing the mixing channel 197 and the reforming catalyst 195, as shown in FIG. 4B.

The reforming catalyst 195 was formed by compressing Ni powder (having an average diameter of 1.0 μm) at a pressure of 618 kg$_f$/cm$^2$, thus growing to a thickness of 1.2 mm. Sintering under a hydrogen atmosphere and at 700° C. for 2 hours, a circular disk was fabricated, followed by cutting into a rectangular shape, resulting in the catalyst.

The reforming catalyst 195 may be varied depending upon reforming source materials. For methane, light oil or gasoline, Ni power may be used to produce the catalyst. On the other hand, when using ethanol or methanol as the source material to obtain synthetic gas as a final product, micrometal powder comprising copper as the major component may be used to produce the catalyst.

Additionally, an auxiliary plate 196 is provided on the bottom face of the catalyst holder plate 190 to mount a lower three-dimensional mixing channel 198. The auxiliary plate 196 functions to prevent leakage of gas vertically fed from the lower reformed gas channeling plate 200.

The lower three-dimensional mixing channel 198 is fitted into the through-hole formed in the center of the auxiliary plate 196, and a thickness of the lower three-dimensional mixing channel 198 is substantially identical to that of the auxiliary plate 196. Moreover, the lower three-dimensional mixing channel 198 has a cross-sectional area smaller than that of the reforming catalyst 195, to thus allow the top face of the auxiliary plate 196 to support the reforming catalyst 195.

The eighth micro channel 185 of the upper reformed gas channeling plate 180 faces and contacts the upper three-dimensional mixing channel 197, while the tenth micro channel 205 of the lower reformed gas channeling plate 200 faces and contacts the lower three-dimensional mixing flow-path 198. Also, the top face of the reforming catalyst 195 contacts the upper three-dimensional mixing channel 197 while the bottom face of the reforming catalyst 195 contacts the lower three-dimensional mixing channel 198.

Therefore, the reforming catalyst 195 is supported on the bottom face of the upper reformed gas channeling plate 180, and between the bottom face of the upper three-dimensional mixing channel 197 and the top face of the lower three-dimensional mixing channel (plate) 198 under the upper reformed gas channeling plate 180, thereby enduring high pressure.

The upper three-dimensional mixing channel 197 and the lower three-dimensional mixing channel (plate) 198 may be composed of a metal mesh material or a porous metal plate.

As shown in FIG. 2, compared to a method for contacting in a direction parallel to the reformed gas, which was described in Korean Patent Application No. 10-2009-0124091 filed by the present inventor, an area contacting the reformed gas is increased to thus impart higher activity in terms of reforming performance. In addition, an area of the reformed catalyst 195 is preferably and effectively greater than the tenth micro channel 205 to cover the tenth micro channel 205.

Based on the foregoing configuration, the source gas may move in a direction perpendicular to the plane of the reforming catalyst 195 in a space between the reforming catalyst 195 and the tenth micro channel 205.

The catalyst holder plate 190 and the auxiliary plate 196 may have a ninth exhaust gas outlet hole 191 on a site corresponding to the first to fourth air feeding holes 111, 121, 131 and 141.

In addition, with regard to the catalyst holder plate 190 and the auxiliary plate 196, a site corresponding to the first to fourth reformed gas exhaust holes 112, 122, 132 and 142, a site corresponding to the first to fifth combustion holes 113, 123, 133, 143 and 153, and a site corresponding to the first to fourth reformed gas channeling holes 114, 124, 134 and 144, are all closed and prevent gas channeling.

Under the reforming reaction part, a lower channel isolation plate 210 is arranged to block communication with the tenth idle holes 203 and 204 of the lower reformed gas channeling plate 200. The lower channel isolation plate 210 may have an eleventh exhaust gas channeling hole 211 and eleventh source gas channeling hole 212, respectively, to communicate the tenth exhaust gas channeling hole 201 and the tenth source gas channeling hole 202.

Under the lower channel isolation plate 210, a source gas preheating part is provided. The source gas preheating part may include waste heat recovering plates 220 and 240, as well as source gas preheating plates 230 and 250, arranged alternately therein. The source gas preheating plates 230 and 250 preheat the source gas inflow, enabling easy reforming reaction thereof. Heat energy required for preheating may be obtained from the exhaust gas by absorption. The waste heat recovering plates 220 and 240 may recover heat of the exhaust gas, thus increasing energy efficiency. According to one embodiment of the present invention, two waste heat recovering plates 220 and 240, as well as two source gas preheating plates 230 and 250, have been used. However, the number of these plates may be increased in consideration of an increase in overall thickness and production costs.

The waste heat recovering plates 220 and 240 and the source gas preheating plates 230 and 250, respectively, may have: twelfth to fifteenth exhaust gas channeling holes 221, 231, 241 and 251 communicating with the eleventh exhaust gas channeling hole 221; twelfth to fifteenth source gas channeling holes 222, 232, 242 and 252 communicating with the eleventh source gas channeling hole 212; twelfth to fifteenth exhaust gas outlet holes 223, 233, 243 and 253 on sites corresponding to the first to seventh exhaust gas outlet holes 113, 123, 133, 143, 153, 163 and 173; and twelfth to fifteenth source gas feeding holes 224, 234, 244 and 254 on sites corresponding to the first to fourth reforming gas channeling holes 114, 124, 134 and 144.

In addition, twelfth to fifteenth micro channels 225, 235, 245 and 255 are provided in a concave form on the top of the waste heat recovering plates 220 and 240 and the source gas preheating plates 230 and 250, respectively. The twelfth micro channel 225 may communicate the twelfth exhaust gas channeling hole 221 and the twelfth exhaust gas outlet hole 223 to each other, while isolating the twelfth source gas channeling hole 222 and the twelfth source gas feeding hole 224 from each other. The thirteenth micro channel 235 may communicate the thirteenth source gas channeling hole 232 and the thirteenth source gas feeding hole 234 to each other, while isolating the thirteenth exhaust gas channeling hole 231 and the thirteenth exhaust gas outlet hole 233 from each other. The fourteenth micro channel 245 may communicate the fourteenth exhaust gas channeling hole 241 and the fourteenth exhaust gas outlet hole 243 to each other, while isolating the fourteenth source gas channeling hole 242 and the fourteenth source gas feeding hole 244 from each other. Lastly, the fifteenth micro channel 255 may communicate the fifteenth source gas channeling hole 252 and the fifteenth source gas feeding hole 254 to each other, while isolating the fifteenth exhaust gas channeling hole 251 and the fifteenth exhaust gas outlet hole 253 from each other.

Under source gas preheating part, a bottom plate 260 is arranged. The bottom plate may have: a source gas temperature measuring tube 262 communicated with the eleventh to fifteenth source gas channeling holes 222, 232, 242 and 252; an exhaust gas outlet line 263 communicated with the twelfth to fifteenth exhaust gas outlet holes 223, 233, 243 and 253; and a source gas feeder 264 communicated with the twelfth to fifteenth source gas feeding holes 224, 234, 244 and 254, all of which are integrated therein.

In addition, although not illustrated, thermocouples are attached to the reformed gas temperature measuring tube 104 of the top plate 100 and the source gas temperature measuring tube 262 of the bottom plate, thereby measuring temperatures of the reformed gas output and the source gas input, respectively.

Further, the foregoing micro channels 115, 125, 135, 145, 165, 175, 185, 205, 225, 235, 245 and 255, respectively, may form a channel closed between the micro channel and the bottom face of the plate just above. Moreover, each of the micro channels 115, 125, 135, 145, 165, 175, 185, 205, 225, 235, 245 and 255 has a cross-sectional area larger than other holes and, therefore, may decrease a flow rate of air, the source gas, exhaust gas and/or reformed gas, thereby increasing heat transfer efficiency. The upper three-dimensional mixing channel 197 and the lower three-dimensional mixing channel 198 have considerably larger cross-sectional area to increase heat transfer efficiency, thereby maximizing contact efficiency to a reactant.

Meanwhile, the air preheating plates 110 and 130, the combustion heat exchange plates 160 and 170, and the waste heat recovering plates 220 and 240 may correspond to plates of the same kind. Likewise, the reformed gas cooling plates 120 and 140, the reforming reaction plates 200, and the source gas preheating plates 230 and 250 may correspond to plates of the same kind. Moreover, by phase-changing the heating plate to an angle of 180° (that is, rotating the same to an angle of 180°, it may be substantially identical to the reforming plate. Accordingly, the present invention may use the same kind of components to considerably reduce production costs.

The hydrocarbon reforming device 2000 according to the present invention is principally configured as described above. The following description will be given to explain operation of the hydrocarbon reforming device 2000.

A fuel gas supplier, a source gas supplier, and an air supplier were respectively connected to the fuel feeder 103, the source feeder 264 and the air feeder 101, in the hydrocarbon reforming device 2000. Then, thermocouples (not shown) were attached to the reformed gas temperature measuring tube 104 and the source gas temperature measuring tube 262, respectively, followed by heating the reactor and conducting reforming reaction.

First, an air flow route is as follows:

Air introduced into the air feeder 101 enters an air inflow line formed of the first to fourth air feeding holes 111, 121, 131 and 141. Then, the air in the air inflow line passes through the first and third micro channels 115 and 135 of the air preheating plates 110 and 130, is fed to a combustion line formed of the first to seventh combustion holes 113, 123, 133, 143, 153, 163 and 173, and mixed with the fuel therein. Here, the bottom of the air inflow line is closed by the upper channel isolation plate 150. Specifically, air is preheated by heat transferred from the reformed gas cooling plates 120 and 140, which are alternately laminated with the air preheating plates 110 and 130, while passing through the first and third micro-paths 115 and 135.

Next, a fuel flow route is as follows:

A gaseous fuel introduced into the fuel feeder 103 passes through a combustion line and is burnt, while being ignited by the ignition catalyst 105 applied to the fuel feeder 103, thus resulting in an exhaust gas state and reaching the combustion heat exchange plates 160 and 170. The hot exhaust gas having combustion heat (due to combustion) passes through the sixth and seventh micro channels 165 and 175 of the combustion heat exchange plates 160 and 170, in turn, sequentially passing through: an exhaust gas feeding line formed of the sixth to fifteenth exhaust gas channeling holes 161, 171, 181, 191, 201, 211, 221, 231, 241 and 251; the twelfth and fourteenth micro channels 225 and 245 of the waste heat recovering plates 220 and 240; and an exhaust gas channeling line formed of the twelfth to fifteenth exhaust gas channeling holes 223, 233, 243 and 253, and is discharged out of the exhaust gas outlet 263 of the bottom plate 260. The top of the exhaust gas feeding line is closed by the upper channel isolation plate 150 while the bottom thereof is also closed by the top face of the bottom plate 260.

Further, a flow route of the source gas and the reformed gas is as follows:

First, the source gas is fed through the source feeder 264, passes through a source gas inflow line formed of the twelfth to fifteenth source gas feeding holes 224, 234, 244 and 254, in turn, passing through the thirteenth and fifteenth micro-flow paths 235 and 255 of the source gas preheating plates 230 and 250, thus being preheated. Here, the preheating of the source gas is performed by receiving heat residue of the exhaust gas passing through the twelfth and fourteenth micro-paths 225 and 245 of the waste heat recovering plates 220 and 240 through thermal conduction. Then, the treated source gas passes through a source gas channeling line formed by the tenth to fifteenth source gas channeling holes 202, 212, 222, 232, 242 and 252, and then, is fed into the tenth micro channel 205. The top of the source gas inflow line is closed by the lower channel isolation plate 210, while the top of the source gas channeling line is closed by the catalyst holder plate 190 and the auxiliary plate 196.

Since the tenth micro channel 205 is in contact with the reforming catalyst 195, the reformed gas is generated through reforming reaction in a space formed by the tenth micro channel 205 and the reforming catalyst 195. The reformed gas generated above passes through a reformed gas channeling line formed of the first to eighth reformed gas channeling holes 114, 124, 134, 144, 154, 164, 174 and 184, in turn, passing through the second and fourth micro channels 125 and 145 of the reformed gas cooling plates 120 and 140. Following this, the reformed gas cooled while passing through the second and fourth micro channels 125 and 145, passes through a reformed gas outflow hole formed of the first to fourth reformed gas exhaust holes 112, 122, 132 and 142, and then, is discharged out of the reformed gas exhaust line 102 of the top plate 100. The bottom of the reformed gas channeling line is closed by the lower channel isolation plate 210 while the bottom of the reformed gas inflow line is closed by the upper channel isolation plate 150.

In addition, since the reformed gas temperature measuring tube 104 is communicated with the reformed gas channeling line, a temperature of the reformed gas before cooling the same may be measured by a thermocouple not illustrated in the figure. Since the reformed gas temperature measuring tube 104 is closed, the reformed gas cannot leak from the reformed gas temperature measuring tube 104.

Since the source gas temperature measuring tube 262 is communicated with the source gas channeling line, a temperature of the source gas after preheating the same may be measured by a thermocouple not illustrated in the figure. Since the source gas temperature measuring tube 262 is closed, the reformed gas cannot leak from the source gas temperature measuring tube 262.

Fabrication of Reactor and Experimental Example

Figure 6:
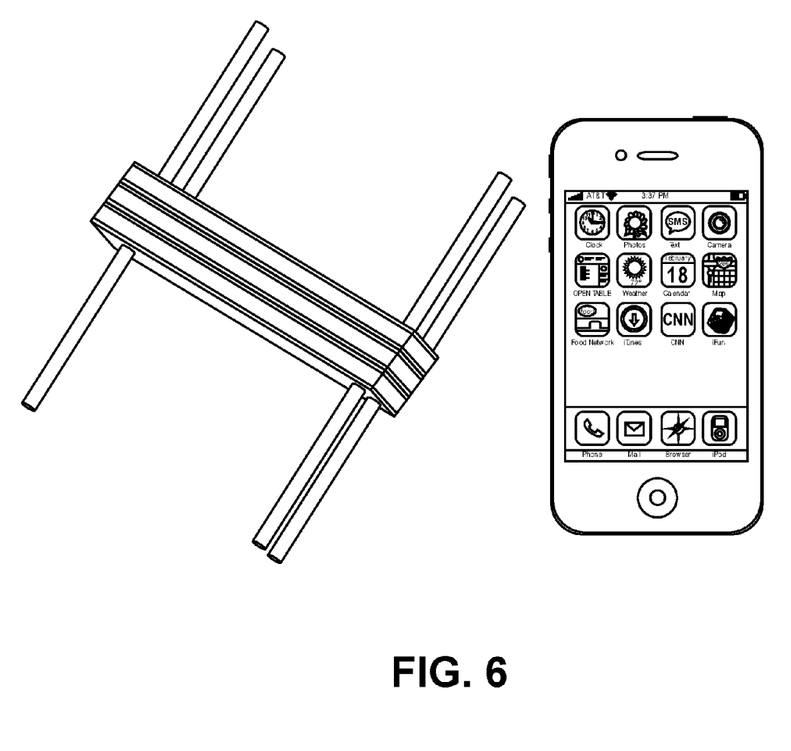
FIG. 6 is a photograph showing the hydrocarbon reforming device according to the present invention.

A reactor according to one embodiment of the present invention was fabricated as shown in FIG. 6. A structural plate was subjected to etching to form a channel, the channel was laminated in plural according to the foregoing procedures, followed by diffusion bonding at 800° C., thus completing the reactor.

Figure 7:
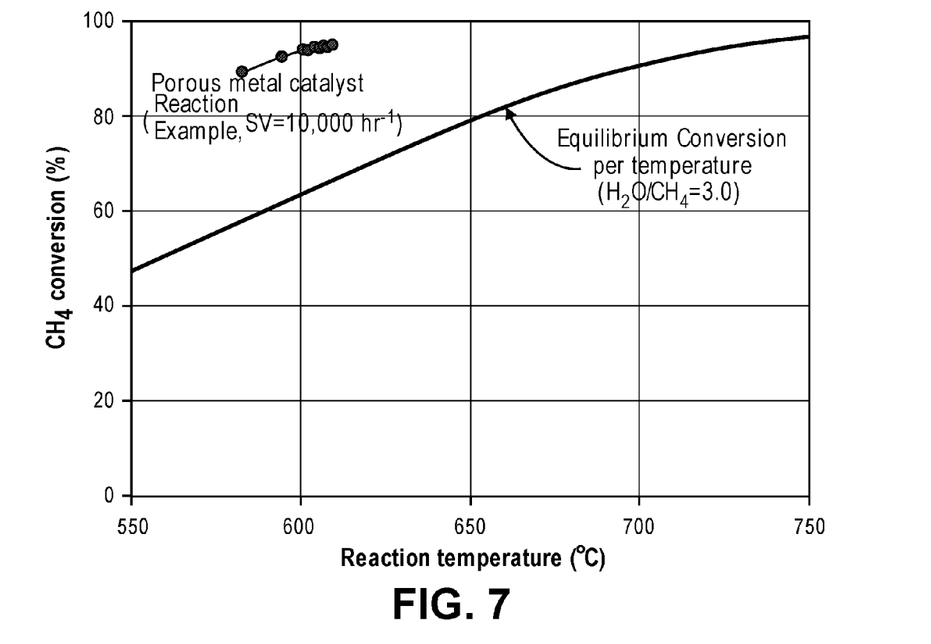
FIG. 7 is a result of methane steam reforming reaction in the hydrocarbon reforming device shown in FIG. 6 (methane conversion according to the reaction temperatures)
Figure 8:
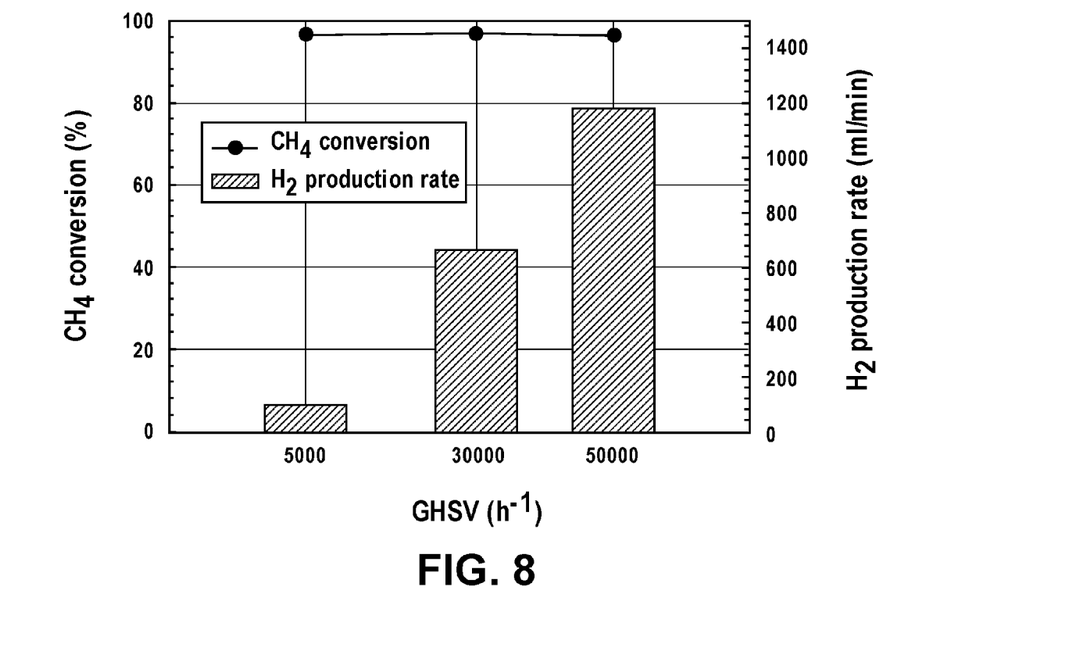
FIG. 8 is a result of methane steam reforming reaction in the hydrocarbon reforming device shown in FIG. 6 (methane conversion and hydrogen production rate according to the GHSV)

Results of assaying performance of the reactor are shown in FIGS. 7 and 8.

As a result of methane steam reforming reaction (S/C=3) at a space velocity of 10,000/hr, a methane conversion of 90 to 95% at 580 to 620° C. was obtained. This is a result remarkably exceeding an equilibrium conversion of 30 to 50% at the same temperature, and is obtainable by rapidly penetrating a product, that is, hydrogen through the catalyst plate. In addition, as a result of measuring methane conversion per gas-hourly space velocity (GHSV) at the reaction temperature of 650° C., 95% or more of methane conversion was attained at the space speed of 5,000 to 50,000/hr. Such a result may be obtained since a feeding rate of heat of reaction required for the reforming reaction is noticeably high. That is, in the case where a catalyst comprising existing ceramic materials as a major component is used, heat transfer rate is limited to cause a difficulty in operation with a space velocity of 10,000/hr. On the other hand, the configuration of the reactor and the gas penetration system according to the present invention may ensure unexpected effects.

Consequently, it can be demonstrated that the configuration of an MCR reactor comprising penetration of a porous metal catalyst according to the present invention may provide a novel concept of a reforming reactor with superior performance to overcome restrictions in the related art.

While the present invention has been described with reference to the preferred embodiments, it will be understood by those skilled in the related art that various modifications and variations may be made therein without departing from the scope of the present invention as defined by the appended claims.

The invention claimed is:

1. A hydrocarbon reforming device using a micro channel heater, comprising:
   a top plate including an air feeder connected to an air supplier to supply air, a fuel feeder which is connected to a fuel supplier to supply the fuel and has an ignition catalyst applied to the inner wall of the fuel feeder, and a reformed gas exhaust line wherein the reformed gas is generated by reforming reaction;
   a bottom plate including a source feeder connected to a source (gas) supplier to supply the source gas and an exhaust gas outlet line wherein the exhaust gas is generated from the reaction;
   an air preheating part which is provided under the top plate and includes a heating plate and a reforming plate alternately laminated therein, wherein the supplied air from the air feeder is preheated using heat residue of the reformed gas and mixed with the fuel, in turn conducting combustion;
   an upper channel isolation plate which is provided under the air preheating part and through which the combusted exhaust gas and reformed gas only are passed;
   a reforming reaction part having: a heating plate which is provided under the upper channel isolation plate to transfer heat of combustion ('combustion heat') of the exhaust gas; and a reforming plate which is provided under the heating plate and arranged between an upper reformed gas channeling plate and a lower reformed gas channeling plate, to expose the reforming catalyst to top and bottom sides, thereby enabling the source gas to move in a direction perpendicular to the reformed catalyst while contacting the same;
   an lower channel isolation plate which is provided under the reforming reaction part, to pass only the exhaust gas passing through the reforming reaction part as well as the preheated source gas therethrough; and
   a source gas preheating part which is arranged between the bottom of the upper channel isolation plate and the top of the bottom plate, and includes a waste heat recovering plate and a source gas preheating plate alternately laminated therein, to preheat the source gas with the exhaust gas passing through the reforming reaction part,
   wherein micro channels are provided respectively on the top face of the heating plate, the top face of the reforming plate, the bottom face of the upper reformed gas channeling plate, and the top face of the lower reformed gas channeling plate.

2. The device according to claim 1, wherein the air feeder and the fuel feeder are arranged to face each other, and the reformed gas exhaust line is arranged while being spaced from the air feeder and the fuel feeder, in the top plate;
   wherein the bottom plate has substantially the same cross-sectional shape and area as the top plate, and the fuel feeder is located at the same position as the fuel feeder in the top plate.

3. The device according to claim 1, wherein the heating plate has four through-holes arranged while being spaced from one another, and two among these holes are communicated with the micro channel while the micro channel crosses between the other two through-holes;
   wherein four through-holes and micro channels are arranged on the reforming plate and the lower reformed gas channeling plate, respectively, in such a way that the above plates are substantially identical to the heating plate rotated at an angle of 180° on a horizontal plane; and
   wherein the upper reformed gas channeling plate is substantially identical to the heating plated turned over, in such a way that the lower reformed gas channeling plate faces the micro-path.

4. The device according to claim 1, wherein the bottom face of the reforming catalyst is arranged to be in the same plane as the bottom face of the catalyst holder plate, a thickness of the reforming catalyst is thinner than that of the catalyst holder plate, an upper three-dimensional mixing channel is mounted above the reforming catalyst to be in the same level as the top face of the catalyst holder plate, and a lower three-dimensional mixing channel is provided on the center of the bottom face of the catalyst holder plate by an auxiliary plate.

5. The device according to claim 4, wherein the upper three-dimensional mixing channel is protruded over the catalyst holder plate before bonding, while being in the same level as the top face of the catalyst holder plate when being bonded and compressed by compressive force.

6. The device according to claim 4, wherein a cross-sectional area of the lower three dimensional mixing channel is smaller than that of the reforming catalyst.

* * * * *